United States Patent Office 3,274,835
Patented Sept. 27, 1966

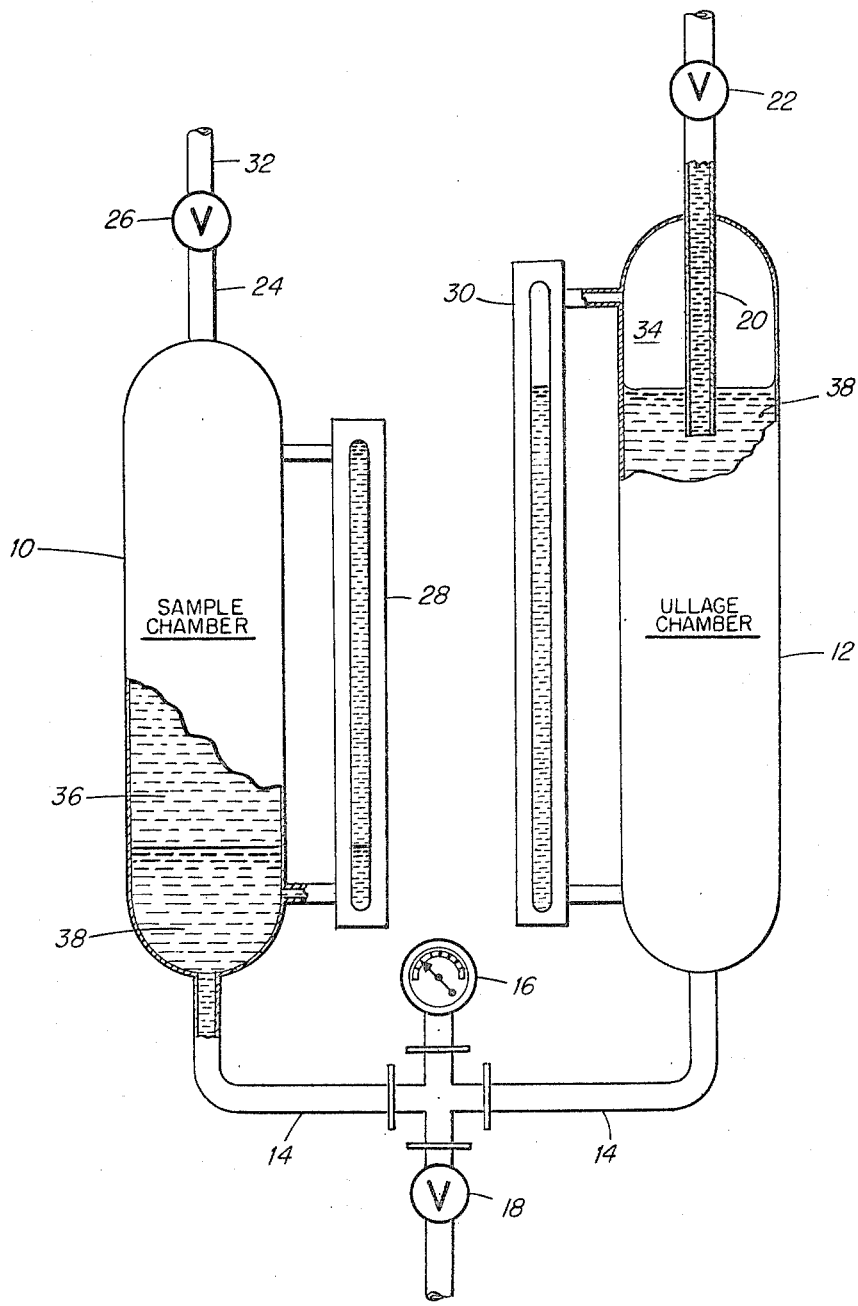

3,274,835
SAMPLE CHAMBER SYSTEM
Donald K. Mosher, Glassboro, N.J., assignor to Mobil Oil Corporation, a corporation of New York
Filed Mar. 18, 1964, Ser. No. 352,840
3 Claims. (Cl. 73—422)

This invention relates to an improved sample container. More specifically, the present invention relates to the sampling of petroleum products and the like, which sample procedure is improved by a novel sampling chamber system.

In the course of laboratory procedure or product control of a manufacturing process stream, process fluids frequently are sampled for analysis. Procedures for sampling have been established and standardized, see ASTM Standard on Petroleum Products and Lubricants: Sampling Liquified Petroleum Gases D1265–55, incorporated herein by reference. The present invention is concerned only incidentally with product sampling, however, as it primarily pertains to a novel sampling chamber system and to methods of withdrawing for analysis a representative sample therefrom.

Suitable methods are available for obtaining a representative sample of a fluid stream in a closed container, such as the ASTM procedure referred to above. Customarily, the fluid sample is maintained in the liquid state in a closed container provided with about a 20% ullage to allow for expansion due to temperature variations. When, however, the liquid sample is removed from the closed container, the resultant drop in pressure induces fractionation, especially if the product is highly volatile, and the lower boiling materials preferentially remain in the container as vapor. Thus, for example, if a representative sample of a product stream of a mixture of propane and butane in a closed container is partially removed, either to provide for ullage or for analysis, that portion removed will be higher in butane, that portion remaining will be higher in propane and neither portion truly will be representative of the sample.

Accordingly, it is a primary object of the present invention to provide a sample chamber system and method of withdrawing a representative sample therefrom.

In one embodiment the present invention comprises a sample chamber system capable of providing for ullage and the removal of any portion of the total sample volume without variation in sample composition.

The principles and advantages of the present invention will be more fully understood by a consideration of a preferred embodiment shown in the attached drawing.

The preferred sample chamber system of the present invention comprises two pressure vessels of a convenient volume, a sample chamber 10 and an ullage chamber 12. To provide for about 20% ullage for the system, ullage chamber 12 has a volume about 1.4–1.5 times that of sample chamber 10. Those skilled in the art will recognize that the relative volume of the ullage is not critical. It is merely highly preferable that an ullage be provided to avoid rupture of the system due to liquid expansion, and customarily the ullage comprises about 20% of the container volume. The two chambers are interconnected at their bases with an unobstructed connecting line 14, provided with a pressure gauge 16 and an outlet valve 18. Ullage chamber 12 is provided preferably with an outage tube 20, extending therein for a distance sufficient to insure an adequate ullage, and an outage valve 22. Sample chamber 10 is provided with an inlet sampling line 24 and sampling valve 26. To facilitate the operation of the method of the present invention the present system contains a sample chamber sight glass 28 and an ullage chamber sight glass 30.

The recommended method of charging the system is as follows: Drain chambers 10 and 12 through outlet valve 18. Fill sample chamber 10 with water through valve 18 while ullage chamber 12 becomes partially filled, venting through open valves 22 and 26. Close all valves and disconnect the water supply, not shown. Connect a short piece of tubing 32 from the sampling valve 26. Open sample valve 26 and slowly allow the sample liquid into the sample chamber 10 by throttling the displaced water to vent through outage valve 22. When the sample chamber 10 is about ⅘ filled with sample liquid, as shown by sight glass 28, close outage valve 22 first and then sampling valve 26. The system is now filled with a representative liquid sample; and an ullage space 34 is provided in chamber 12 and the sample liquid 36 is sealed from the ullage space by water 38. Consequently fractionation of the sample upon evacuation from the closed system is precluded by the water seal. A seal liquid other than water may be employed; of necessity, however, the liquid employed as a seal must be immiscible with the sample liquid.

According to the present invention, a preferred method of withdrawing a representative sample for laboratory analysis is as follows: Apply pressure to the system by connecting an air supply not shown to outage valve 22 equipped with a suitable air regulator and pressure gauge. Connect to the outlet of sampling valve 26 a coil line, not shown, immersed in a cooling medium such as an ice bath, and provided with a closed valve at its outlet. Completely open sampling valve 26 and remove sample by throttling the outlet valve of the coil line. Close all valves and plug screwed connections to prevent leakage from the system.

Alternatively, the sample may be charged to an instrument such as a chromatograph for analysis; accordingly an alternative method of charging an instrument with a representative sample according to the present invention is as follows: Connect sample valve 26 to the instrument inlet with suitable tubing. Connect an air supply to outage valve 22 to apply pressure to ullage chamber 12 as in the above procedure. Withdraw a representative sample through sampling valve 26 as necessary or until sample container 10 is nearly full of water. Disconnect the air supply and the instrument inlet connection.

The pressure of the system both during sampling and withdrawal desirably is at least as great as the vapor pressure of the sample liquid in order to prevent fractionation thereof.

In each method when the sample supply is exhausted, both chambers may be drained through outlet valve 18, venting through sampling valve 26 and outage valve 22.

The component chambers 10 and 12 of the present sample chamber system may be of any convenient size required for sampling purpose for which it may be suited. As hereinabove mentioned, preferably ullage chamber 12 is about 1.4–1.5 times as large in internal volume as is sample chamber 10 to provide the equivalent of about 20% ullage for the entire system. Materials of construction of the chambers, lines and fittings are determined by the pressure, corrosion or sample contamination limitations or requirements desired for the system.

The seal liquid may preferably be other than water, particularly where the sample liquid is soluble in or miscible with water. If the seal liquid is lighter in gravity than the sample liquid, the system may be reduced to a single chamber: the ullage at the top, the sample at the bottom with the seal liquid therebetween.

The present scheme beneficially eliminates the product loss and composition variations normally encountered because of fractionation during the withdrawal of a volatile sample from a closed container, by the provision of a liquid seal between the sample and the ullage space above the sample. The principle of the present invention resides in a novel apparatus embodying a preclusion of evaporation from a sample by the provision of an immiscible sealing liquid between the surface thereof and the ullage.

Additional modifications and improvements utilizing the discovery of the present invention can be readily anticipated by those skilled in the art and may fairly be presumed to be within the scope and purview of the invention as defined by the claims that follow.

I claim:

1. An apparatus for the containment of a volatile liquid sample, which prevents fractionation of said liquid sample upon its withdrawal therefrom, which apparatus comprises means defining two chambers, a substantially unobstructed conduit in communication with each of said chambers at the base thereof, one of said chambers being a sample chamber, the other of said chambers being an ullage chamber of an internal volume larger than that of said sample chamber, means to introduce and to remove a sample to and from said sample chamber, means to remove material from and to apply pressure to the top of said ullage chamber which includes an outage tube extending downwardly into said ullage chamber a sufficient distance to insure adequate ullage, and outlet means by which said apparatus may be evacuated.

2. A sample chamber system, which comprises a cylindrical sample chamber substantially vertically oriented, said sample chamber being provided with a sampling inlet line and a sampling valve at the top thereof; a cylindrical ullage chamber having an internal volume greater than that of said sample chamber and being substantially parallel therewith and extending upwardly above a level of the top thereof, said ullage chamber being provided with an outage tube extending downwardly into said ullage chamber to insure an ullage comprising about 20 percent of said chamber system; and a connecting line joining said sample chamber and said ullage chamber by connection at the bases thereof, said connecting line being provided with an outlet valve.

3. A method for using an apparatus for the containment of a volatile liquid sample, which prevents fractionation of said liquid sample upon its withdrawal therefrom, which apparatus comprises means defining two chambers, a substantially unobstructed conduit in communication with each of said chambers at the base thereof, one of said chambers being a sample chamber, the other of said chambers being an ullage chamber of an internal volume larger than that of said sample chamber, means to introduce and to remove a sample to and from said sample chamber, means to remove material from and to apply pressure to the top of said ullage chamber which includes an outage tube extending downwardly into said ullage chamber a sufficient distance to insure adequate ullage, and outlet means by which said apparatus may be evacuated, said method comprising draining said sample and ullage chambers, then filling said sample chamber and partially filling said ullage chamber with a seal liquid immiscible with the sample, wherein the unfilled portion of said ullage chamber is sufficient to compensate for later thermal expansion of fluid contained by the chambers, introducing a sample in liquid state to the sample chamber by displacement therefrom of said seal liquid to said ullage chamber and concurrently discharging from said ullage chamber a corresponding amount of seal liquid, and thereafter withdrawing from said sample chamber a portion of the sample representative of the whole by the displacement of seal liquid from said ullage chamber to said sample chamber under pressure not less than the vapor pressure of the sample.

References Cited by the Examiner
UNITED STATES PATENTS

| | | | |
|---|---|---|---|
| 2,245,679 | 6/1941 | Kelly | 73—422 |
| 2,608,866 | 9/1952 | Breedlove et al. | 73—422 |
| 3,201,995 | 8/1965 | Griffith et al. | 73—422 |

LOUIS R. PRINCE, *Primary Examiner.*

S. C. SWISHER, *Assistant Examiner.*